(No Model.) 4 Sheets—Sheet 1.
M. DICKERSON.
ELECTRIC CONDUIT AND APPURTENANCES.
No. 569,618. Patented Oct. 20, 1896.
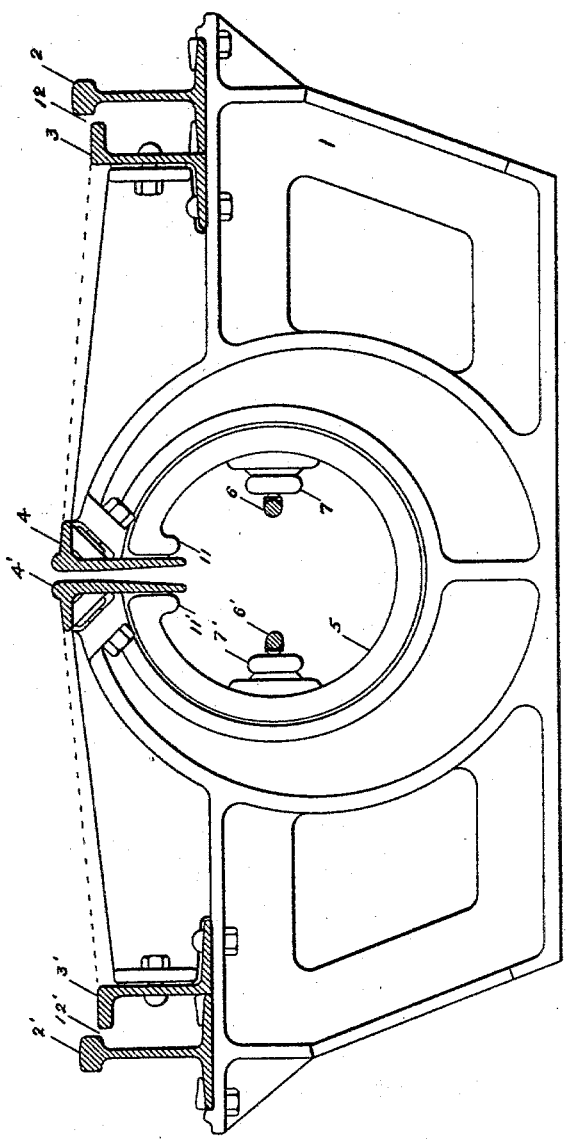
Fig. I.
WITNESSES:
INVENTOR
Malcolm Dickerson
BY
R. A. Taylor
ATTORNEY.

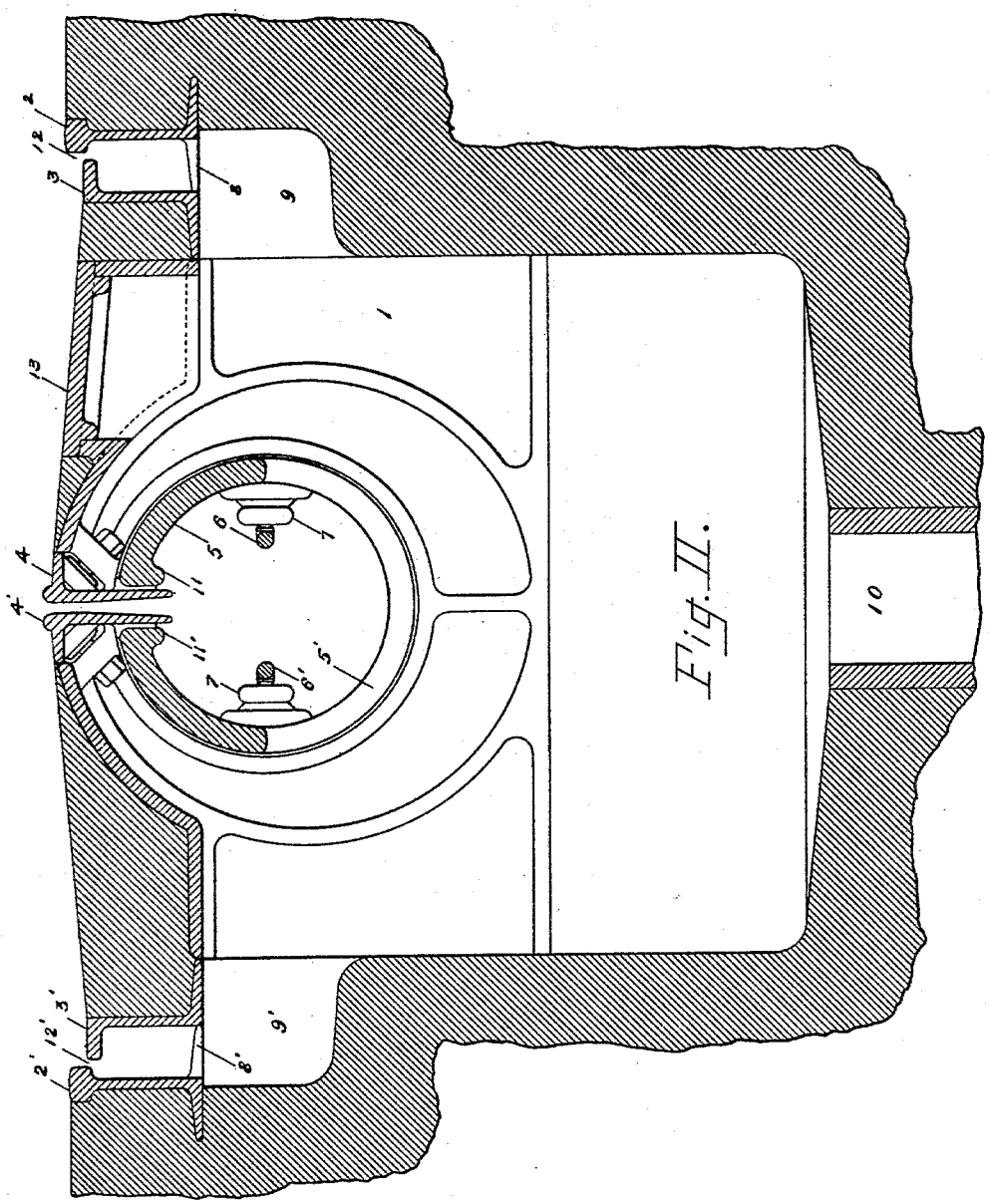

(No Model.)
4 Sheets—Sheet 3.
M. DICKERSON.
ELECTRIC CONDUIT AND APPURTENANCES.
No. 569,618.  Patented Oct. 20, 1896.
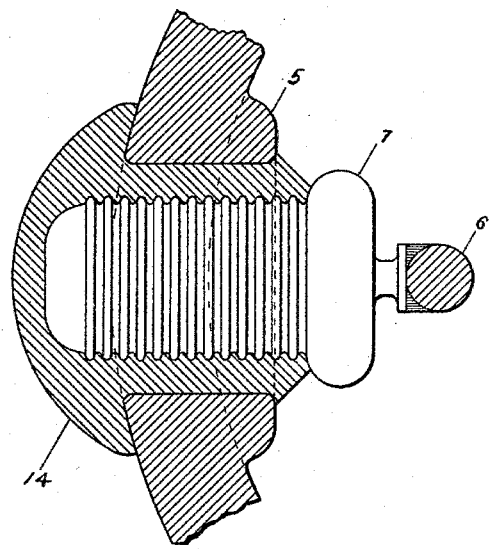
Fig. III.
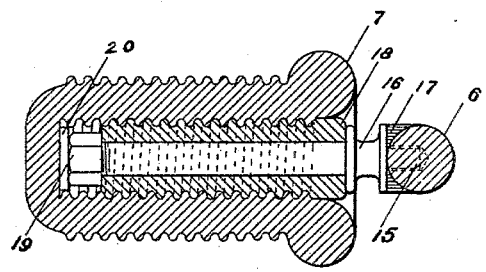
Fig. IV.
WITNESSES:
INVENTOR
ATTORNEY.

(No Model.) 4 Sheets—Sheet 4.
M. DICKERSON.
ELECTRIC CONDUIT AND APPURTENANCES.
No. 569,618. Patented Oct. 20, 1896.
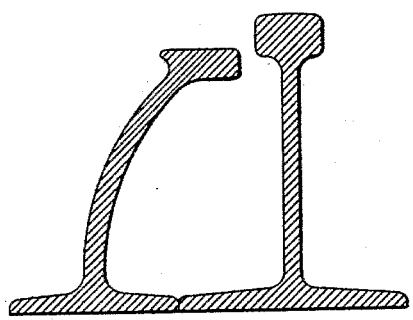
*Fig. V.*
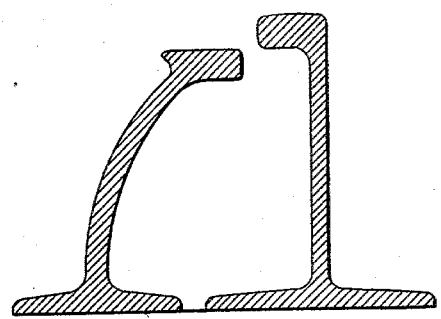
*Fig. VI.*
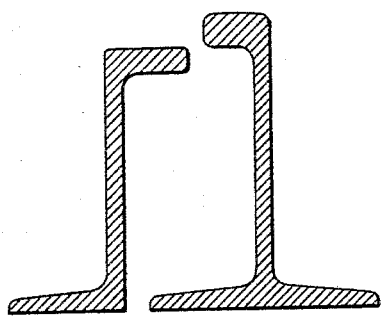
*Fig. VII.*
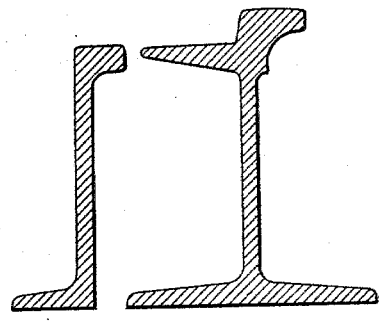
*Fig. VIII.*
WITNESSES:
E. M. Hulse
W. M. Hinde
INVENTOR
Malcolm Dickerson
BY R. S. Taylor
ATTORNEY.

UNITED STATES PATENT OFFICE.

MALCOLM DICKERSON, OF FORT WAYNE, INDIANA.

ELECTRIC CONDUIT AND APPURTENANCES.

SPECIFICATION forming part of Letters Patent No. 569,618, dated October 20, 1896.

Application filed September 11, 1893. Serial No. 485,214. (No model.)

*To all whom it may concern:*

Be it known that I, MALCOLM DICKERSON, a citizen of the United States, residing at Fort Wayne, in the county of Allen, in the State of Indiana, have invented certain new and useful Improvements in Electrical Conduits and Appurtenances; and I do hereby declare that the following is a full, clear, and exact description of the invention, which will enable others skilled in the art to which it appertains to make and use the same, reference being had to the accompanying drawings, which form part of this specification.

My invention is of an improved electric-railway conduit and appurtenances thereto.

In the description the drawings will be referred to as Figures I, II, III, IV, V, VI, VII, and VIII. Fig. I shows an end elevation of track construction, looking through conduit. Fig. II shows a cross-section of track through manhole. Figs. III and IV are details of construction, showing a method of fastening conductor and insulator in place; and Figs. V, VI, VII, and VIII are modifications of form of track and side slot-rails.

Similar figures indicate similar parts in the several drawings.

In Fig. I, 1 is a cast-iron yoke resembling very closely those used in cable-roads and supporting track-rails 2 and 2', side slot-rails 3 and 3', and central slot-rails 4 and 4', all of which are attached to the yokes as shown or in any other suitable manner. The yokes are placed at any convenient distance apart, about four feet being preferable. The conduit 5 is made of hard non-conducting material, preferably sewer-pipe clay burned hard and vitrified inside and out and with a longitudinal slot on the upper side, formed with interiorly-depending lips, as shown at 11 and 11'. At 6 and 6' are conductors (shown in section) supported by insulators 7 and 7', which are shown in detail in Figs. III and IV. At 4 and 4' are central slot-rails, which enter the conduit-slot and extend below the lips 11 and 11' of the conduit. This is for the purpose of protecting the conduit against mechanical injury and for directing what water may flow through the slot away from the sides of the conduit and so keeping the conductors and supports practically dry. The conduit is made in sections of such length—say four feet, scant—as to meet and abut within the yokes, where they are joined in cement. The lips 11 and 11' are for the purpose of forming drips for any water that may find its way between the slot-rails and the conduit.

At convenient intervals of, say, thirty-two feet a manhole is made between two adjacent yokes, as shown in Fig. II. The conduit-pipe crossing the manhole is provided with an opening upon its under side for escape of water from the conduit into the manhole, from which it passes through the bottom of the manhole into the sewer 10, and also to provide access to the conduit. This opening is shown at 5' in Fig. II. The T-rails 2 and 2' form the tramway for the support of the car. The slot-rails 3 and 3' form flanges to the T-rails, leaving narrow openings 12 and 12' to receive water shed from the sloping surfaces extending from the central slot-rails 4 and 4', thus reducing to a very small quantity the water entering the central slot. The spaces thus inclosed by the track-rails and side slot-rails form water-conduits. Any form of track-rail or slot-rail may be used adapted to form a conduit.

Several modifications are shown in Figs. V, VI, VII, and VIII as illustrations. At each manhole a portion of the foot-flanges of the T-rails is cut away, as shown at 8 and 8', to pass the water into the manhole, or any other mode of escape of the water may be provided.

The conductors may be attached to the sides of the conduit in any suitable manner, but that shown in Figs. III and IV is preferred. In the side of the conduit-pipe an opening is formed, (shown in section in Fig. III,) preferably with a shoulder inside the pipe, as shown, for greater strength, in which the insulator 7, ribbed on the outside and threaded in the inside, is set in a cement mass, (shown in section at 14.) The insulator-core 18 is preferably made of some slightly-yielding substance, as wood, paraffined, and is threaded to screw into the insulator. Through this core passes a short rod 16, having at its inner end the threaded nut 19 and at its outer end the threaded terminal 15, which is tapped into the conductor 6, which consists, preferably, of a solid brass rod. The insulators may be set at any suitable distance apart—say two feet—and placed one foot from the ends of the conduit-sections. For additional security of fastening brazing may be used between the conductor 6 and shoulder of the rod 16, as indicated at 17. At 20 is a washer, of any flexible material, such as rubber or asbestos, between the end of the rod 16 and the inner end of the opening in the insulator.

It is contemplated that in putting down the conduit the conducting-rod shall be used in sections of about sixteen feet in length and fastened in place upon the insulators as the conduit is laid down, the ends of two sections being brazed together as put down. The ends meeting at the manholes (between which a small space can be left) can be united by an expansion-joint after the conduit is complete. For use in a direct-current system one of these conductors is to be used for the positive and the other for the negative division of the circuit. For use with a triphase system the track will constitute the third conductor.

I claim—

1. The combination with an electric conduit, of conductor-supports each comprising a hollow insulating-sleeve having an enlarged head which abuts on the outer surface of the conduit and a body portion which fits and is sealed within an aperture in said wall, said sleeve being open at its inner end only, a slightly-yielding non-metallic tubular core inserted within said sleeve, a metallic stem seated in the tubular core, and means for attaching the conductor to the outer end of the stem.

2. In an electrical conduit a pipe made of hard non-conducting material formed with a longitudinal slot through its top and interiorly-depending integral lips in the edges of said slot in combination with two surface slot-rails extending downward through the slot in the pipe and past the lips thereof.

3. The combination with the transverse supporting-yokes having the slotted conduit-pipe mounted centrally therein and provided with center slot-rails depending into said pipe, of the track-rails mounted on the ends of the yokes, and the side slot-rails mounted adjacent to the track-rails to form lateral drainage-conduits, the center slot-rails being raised above the track-rails, substantially as described.

4. In an electrical railroad a system of supporting-yokes placed at intervals in combination with two central slot-rails two exterior track-rails and two side slot-rails combined substantially as shown.

In testimony whereof I do hereunto subscribe my name, in the presence of two witnesses, this 31st day of August, 1893.

MALCOLM DICKERSON.

Witnesses:
W. M. NINDE,
E. M. HULSE.